United States Patent
Tsurui

(10) Patent No.: US 8,243,295 B2
(45) Date of Patent: Aug. 14, 2012

(54) IMAGE FORMING APPARATUS AND IMAGE FORMING METHOD THAT CONVERTS A TRANSFER SPEED OF THE IMAGE DATA SIGNAL ACCORDING TO A TRANSFER SPEED OF A DESTINATION PROCESSOR

(75) Inventor: Masaki Tsurui, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 881 days.

(21) Appl. No.: 12/332,702

(22) Filed: Dec. 11, 2008

(65) Prior Publication Data

US 2009/0168120 A1 Jul. 2, 2009

(30) Foreign Application Priority Data

Dec. 27, 2007 (JP) ................................ 2007-337029

(51) Int. Cl.
G06F 3/12 (2006.01)
G06K 15/00 (2006.01)

(52) U.S. Cl. ...................................... 358/1.13; 358/1.15

(58) Field of Classification Search ................... 358/1.1, 358/1.9, 1.12, 1.13, 1.14, 1.15, 1.18, 448, 358/474, 482, 500; 710/106, 302, 323
See application file for complete search history.

(56) References Cited

U.S. PATENT DOCUMENTS

| 5,793,993 | A | * | 8/1998 | Broedner et al. | ............. | 710/106 |
| 6,415,351 | B1 | | 7/2002 | Kobayashi et al. | | |
| 6,646,645 | B2 | * | 11/2003 | Simmonds et al. | ........... | 345/502 |
| 7,050,197 | B1 | * | 5/2006 | Szumla et al. | ................ | 358/1.9 |
| 7,382,503 | B2 | * | 6/2008 | Chen et al. | .................... | 358/482 |

FOREIGN PATENT DOCUMENTS

| JP | 10-254827 | 9/1998 |
| JP | 11-120766 | 4/1999 |
| JP | 2004-214949 | 7/2004 |
| JP | 2005-348435 | 12/2005 |
| JP | 2006-20151 | 1/2006 |
| JP | 2006-101444 | 4/2006 |
| JP | 2006-303915 | 11/2006 |

OTHER PUBLICATIONS

Office Action issued Nov. 15, 2011, in Japanese Patent Application No. 2007-337029.

* cited by examiner

*Primary Examiner* — Gabriel Garcia

(74) *Attorney, Agent, or Firm* — Oblon, Spivak, McClelland, Maier & Neustadt, L.L.P.

(57) ABSTRACT

An image processing application specific integrated circuit (ASIC) is capable of receiving a plurality of image data signals having different formats. The image processing ASIC includes a data-format selecting unit that determines a format of each of the image data signals and selects, based on the signal format, one image data signal from among the image data signals.

11 Claims, 5 Drawing Sheets

IMAGE FORMING APPARATUS AND IMAGE FORMING METHOD THAT CONVERTS A TRANSFER SPEED OF THE IMAGE DATA SIGNAL ACCORDING TO A TRANSFER SPEED OF A DESTINATION PROCESSOR

CROSS-REFERENCE TO RELATED APPLICATIONS

The present application claims priority to and incorporates by reference the entire contents of Japanese priority document 2007-337029 filed in Japan on Dec. 27, 2007.

BACKGROUND OF THE INVENTION

1. Field of the Invention

The present invention relates to an image forming apparatus that includes an image scanner, and an image forming method that is executed by the image forming apparatus.

2. Description of the Related Art

In an image forming apparatus disclosed in Japanese Patent Application Laid-open No. 2005-348435, local characteristics of an input image data are detected and selection data is output. Further, the input image data is separated into two pieces of image data by using the selection data and the most suitable conversion process is carried out respectively for the two pieces of image data and the selection data. Thus, deterioration of image quality can be suppressed and a data amount can be reduced even though various images such as picture photographic images and characters, drawing images are mixed together.

In an image forming apparatus disclosed in Japanese Patent Application Laid-open No. 2004-214949, a compression format of an image data having an obscure compression format is detected. When the compression format is the same as that is used for data processing, the compressed image data is input into a data processor without expanding. Thus, drop in the data processing speed can be prevented.

However, in the technology disclosed in Japanese Patent Application Laid-open No. 2005-348435, because local characteristics of the input image data are detected and processing method is changed accordingly, a separate processor is required for each image data, thus resulting in an excessively big device structure.

Even in the technology disclosed in Japanese Patent Application Laid-open No. 2004-214949, because the image data having a different compression format is sent from one scanner and an image data signal itself is different, a separate processor is required for each image data, thus resulting in the excessively big device structure.

SUMMARY OF THE INVENTION

It is an object of the present invention to at least partially solve the problems in the conventional technology.

According to an aspect of the present invention, there is provided an image forming apparatus including an image scanner that generates an image data signal; and an image processor that carries out image processing on the image data signal. The image processor is capable of receiving a plurality of image data signals having different formats and includes a data-format selecting unit that determines a format of each of the image data signals and selects, based on the format, one image data signal from among the image data signals.

According to another aspect of the present invention, there is provided an image forming method implemented on an image forming apparatus. The image forming apparatus includes an image scanner that generates an image data signal, and an image processor capable of receiving a plurality of image data signals having different formats and carrying out image processing on one of the input image data signals. The image forming method including the image processor determining a format each of the image data signals and selecting, based on the format, one image data signal from among the image data signals.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are explained in detail below with reference to the accompanying drawings. In the following embodiments, the image forming apparatus according to the present invention is applied to a multifunction peripheral that includes various functions such as copying, scanning, printing, and facsimile in a single chassis. However, the present invention is not to be limited to the multifunction peripheral and can be applied to any apparatus that includes one or more devices selected from a scanner, a copying machine, a facsimile machine, and an image scanner.

Figure 1:
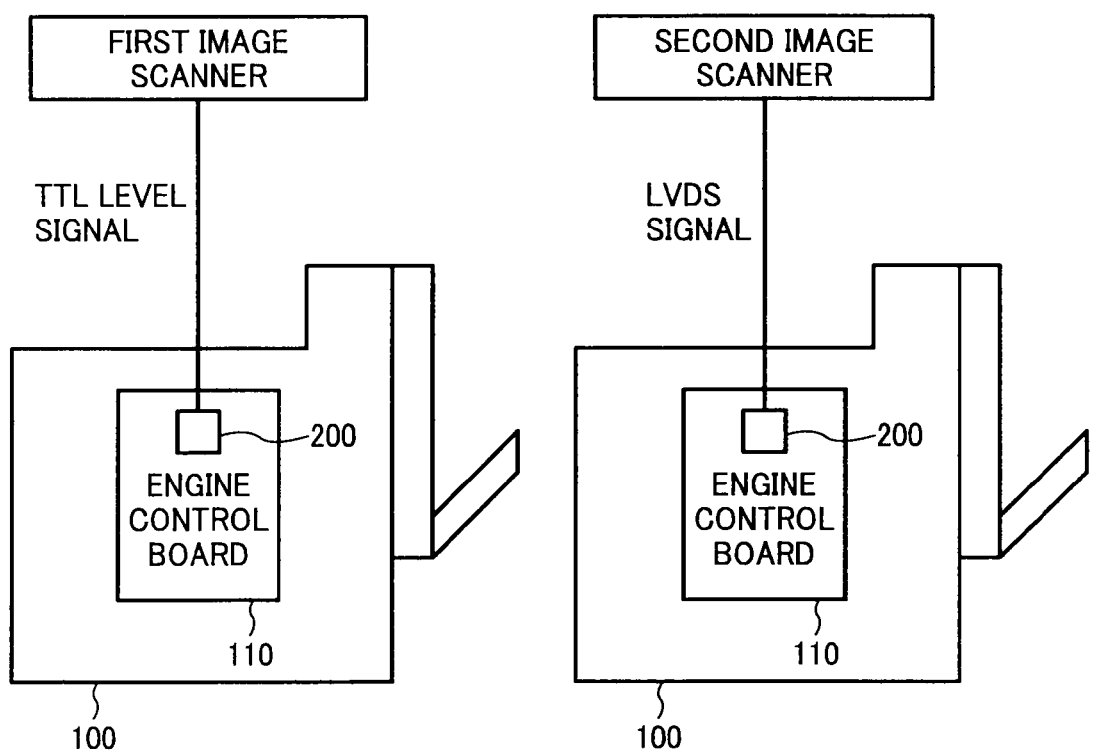
FIG. 1 is a schematic drawing of an outline of a multifunction peripheral according to a first embodiment of the present invention.

FIG. 1 is a schematic diagram of an outline of the multifunction peripherals 100 according to a first embodiment of the present invention. For better understanding of the embodiment, two multifunction peripherals 100 having substantially identical configuration have been shown in FIG. 1. An engine control board 110 that controls engines, such as a printer engine, is mounted on each of the multifunction peripherals 100. An image processing application specific integrated circuit (ASIC) 200 that executes imaging process is mounted on the engine control board 110 of each of the multifunction peripherals 100.

Although multifunction peripherals generally include an image scanner, one of the multifunction peripherals 100 is connected to a first image scanner and the other is connected to a second image scanner. The first image scanner outputs image data in the form of transistor-transistor logic (TTL) level signal to the multifunction peripherals 100 shown on the left. On the other hand, the second image scanner outputs image data in the form of low-voltage differential signaling (LVDS) signal to the multifunction peripherals 100 shown on the right. Incidentally, the first image scanner can be connected to the multifunction peripherals 100 shown on the right and the second image scanner can be connected to the multifunction peripherals 100 shown on the left.

In this manner, image scanners that output image signals having different formats are sometimes connected to the multifunction peripherals 100. The image processing ASIC 200 can receive any of those image signals having different format. Thus, even though an image scanner that outputs image data signal of different format is connected to the multifunction peripherals 100, image processing can be realized by using the simple image processing ASIC 200. Details of the image processing ASIC 200 are explained below.

Figure 2:
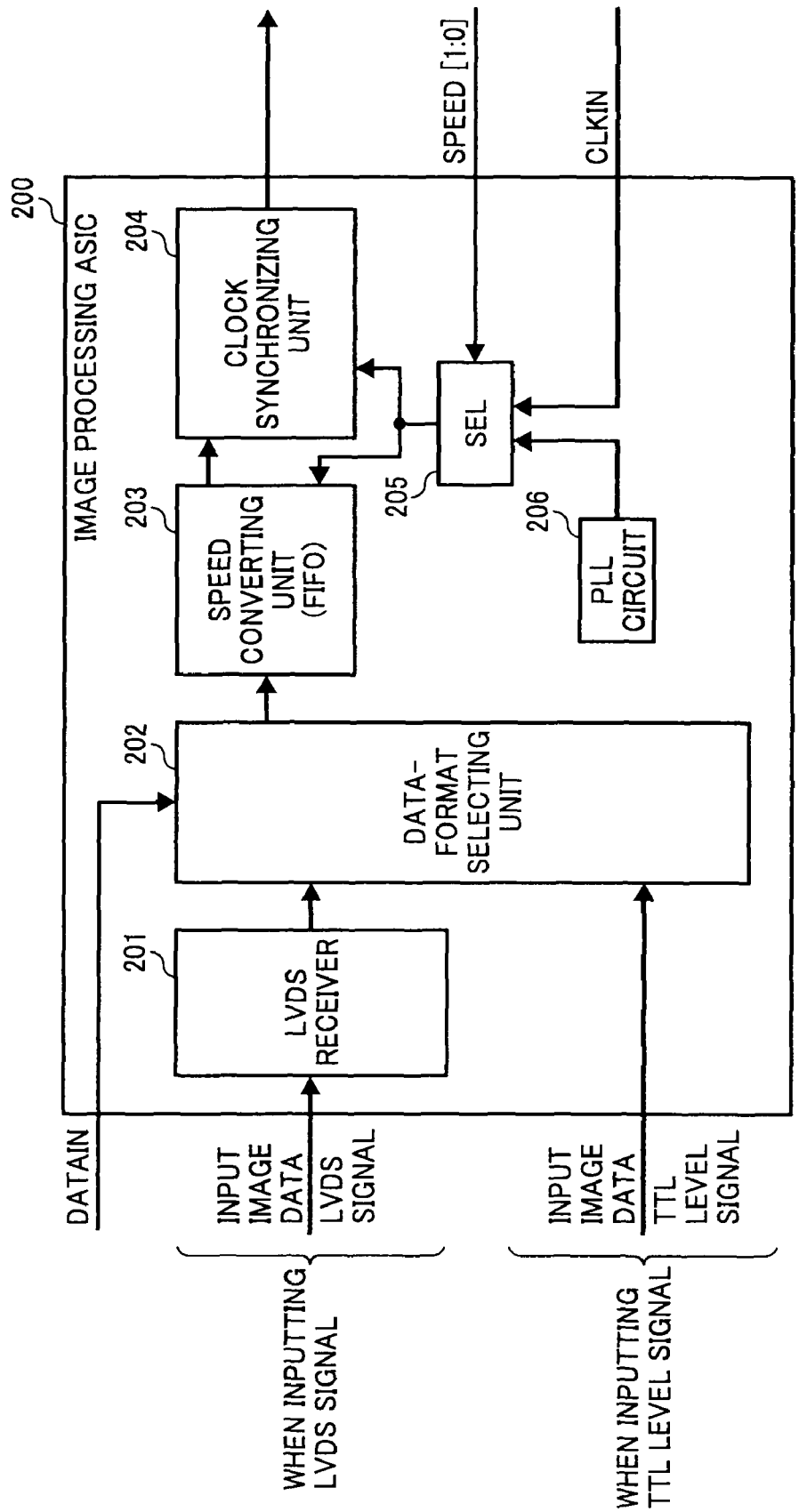
FIG. 2 is a functional block diagram of an image processing ASIC shown in FIG. 1.

FIG. 2 is a functional block diagram of the image processing ASIC 200. The image processing ASIC 200 includes an LVDS receiver 201, a data-format selecting unit 202, a speed converting unit 203, a clock synchronizing unit 204, a selector (SEL) 205, and a phase-locked loop (PLL) circuit 206.

The LVDS signal and the TTL level signal can be input into the image processing ASIC 200 as input image data signal.

The LVDS receiver 201 receives the LVDS signal from the second image scanner, converts the LVDS signal into a single end signal, and outputs the single end signal to the data-format selecting unit 202.

On the other hand, the TTL level signal from the first image scanner is directly input into the data-format selecting unit 202. The data-format selecting unit 202 selects any one of those two signal types, i.e., the single end signal and the TTL level signal, and outputs the selected signal to the speed converting unit 203.

The selected signal output from the data-format selecting unit 202 is input into the speed converting unit 203 as a selected signal. The speed converting unit 203 receives the selected signal and converts the selected signal into an image data signal having a transfer speed that is acceptable to a processor connected to the next stage of the image processing ASIC 200. Specifically, the speed converting unit 203 is a first-in first-out (FIFO) queue. The transfer-speed-converted image data signal is output from the speed converting unit 203 at a clock timing that is decided by the SEL 205.

The PLL circuit 206 is a phase synchronization circuit that outputs to the SEL 205 a multiplied clock that is a multiple of an internal clock generated inside the image processing ASIC 200. The SEL 205 is a circuit that selects, based on a SPEED signal that is received from the next stage processor and that include information indicative of the transfer speed of the next stage processor, any one of the internal clock, the multiplied clock, and a CLKIN clock that is received from the outside of the image processing ASIC 200. The SEL 205 outputs the selected clock to the speed converting unit 203 and the clock synchronizing unit 204. The transfer-speed-converted image data signal is output from the speed converting unit 203 at a clock timing that is decided by the SEL 205.

The clock synchronizing unit 204 receives the transfer-speed-converted image data signal from the speed converting unit 203 at a clock timing that is decided by the SEL 205, and outputs the transfer-speed-converted image data signal to the next stage processor at the clock timing decided by the SEL 205. Thus, the clock synchronizing unit 204 outputs the transfer-speed-converted image data signal by synchronizing with the clock decided by the SEL 205.

An image data input process executed by the multifunction peripheral 100 is explained next. The image processing ASIC 200 of the multifunction peripheral 100 receives the LVDS signal or the TTL level signal from the external image scanner, i.e., the first image scanner or the second image scanner, as an input image data signal.

If the input image data signal is the TTL level signal, the TTL level signal are selected by the data-format selecting unit 202 and output to the speed converting unit 203 as a selected signal.

If the input image data signal is the LVDS signal, the LVDS signal is received by the LVDS receiver 201, converted into a single end signal, and output to the data-format selecting unit 202. In this case, the single end signal is selected by the data-format selecting unit 202 and output to the speed converting unit 203 as the selected signal.

The speed converting unit 203 receives the selected signal and converts the transfer speed of the selected signal thereby obtaining a transfer-speed converted image data signal. The clock synchronizing unit 204 outputs the transfer-speed converted image data signal at the clock timing selected by the SEL 205. The clock synchronizing unit 204 receives the transfer-speed converted image data signal from the speed converting unit 203 and outputs it to the next stage processor at the clock timing selected by the SEL 205. Based on the content of a SPEED signal that is received from the next stage processor, the SEL 205 selects any one of the internal clock, the multiplied clock, and the CLKIN clock, and outputs the selected clock to the speed converting unit 203 and the clock synchronizing unit 204. By outputting the transfer-speed converted image data signal in accordance with the selected clock, the speed converting unit 203 converts the transfer speed of the input image data signal that is acceptable to the next stage processor, and the clock synchronizing unit 204 synchronizes the image data signal with the selected clock and inputs the image data signals into the next stage processor.

In the multifunction peripheral 100, the image processing ASIC 200 can receive any of the two image data signals, in other words, the LVDS signal and the TTL level signal, determine the format of the input image data signals, and based on the determined format, select any one of the input image data signals. Thus, the single image processing ASIC 200 can receive image data signals of different formats and image processes those signals appropriately. In other words, the structure of the multifunction peripheral 100 can be simplified.

In the first embodiment, because the LVDS signal or the TTL level signal are received and selected by the image processing ASIC 200, most of the subsequent data processes can be shared.

In the first embodiment, because the speed converting unit 203 outputs the image data signal at the transfer speed that is acceptable to the next stage processor, specifications required by the next stage processor can be met.

Further, in the first embodiment, because the clock synchronizing unit 204 can output the image data signal by clock-synchronizing with the transfer speed acceptable to the next stage processor, the specifications required by the next stage processor can be met.

Figure 3:
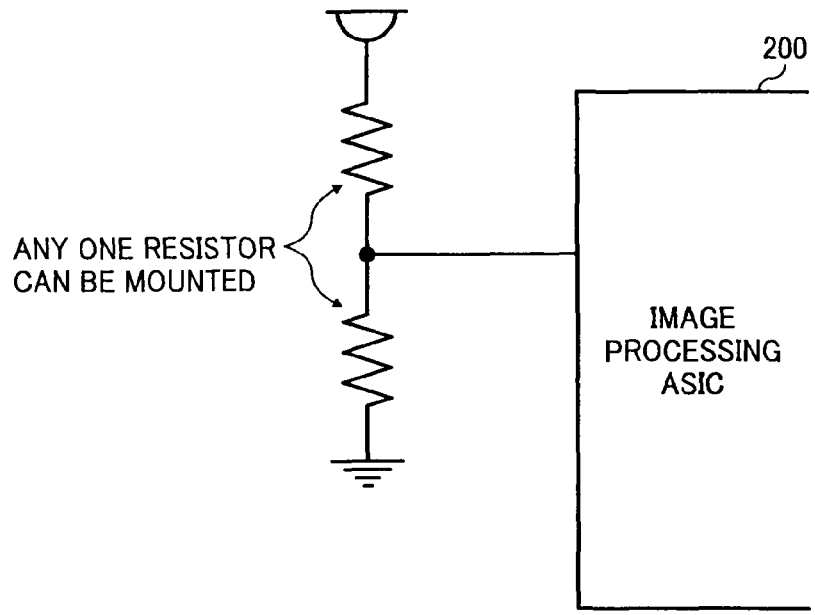
FIG. 3 is a schematic diagram of an example of arrangement of setting terminals used for selecting an input image data signal.

In the first embodiment, the data-format selecting unit 202 is used to perform selection of an input image data signal. Alternatively, setting terminals can be provided to the image processing ASIC 200, and selection of an input image data signal can be performed by using those setting terminals. FIG. 3 is a schematic diagram of an example of such setting terminals provided to the image processing ASIC 200 for selecting the image data signal. The setting terminals can be structured such that any one of two resistors can be prior set depending on the format of the input image data signals.

Thus, by prior determining an image data signal to be selected by the setting terminals of the image processing ASIC 200, any one of the LVDS signal and the TTL level signal can be received, and the device structure can be further simplified.

Figure 4:
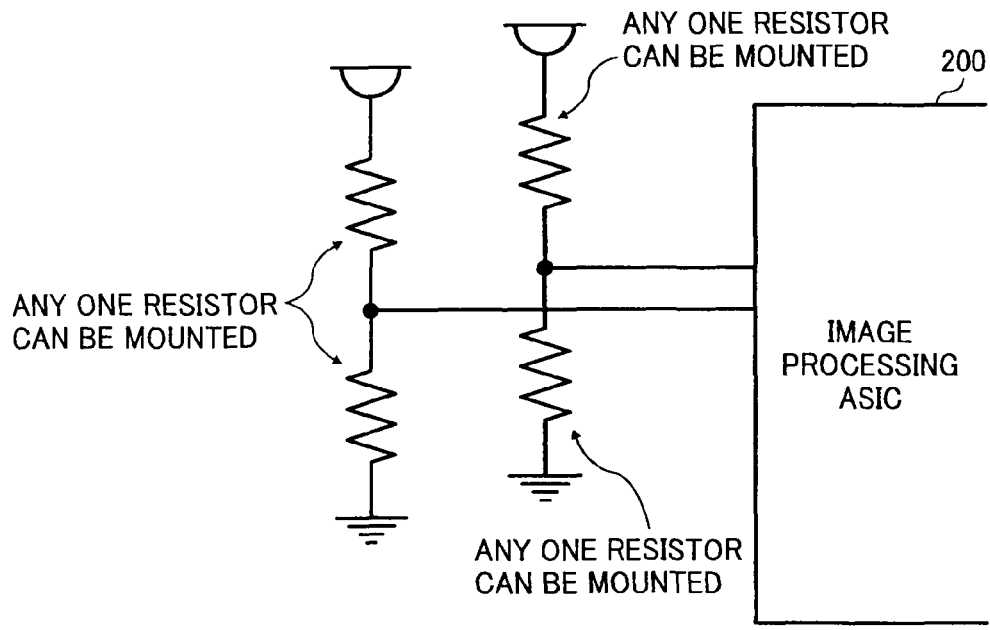
FIG. 4 is a schematic diagram of an example of arrangement of setting terminals used for switching over the transfer speed of an input image data signal.

In the first embodiment, the speed converting unit 203 is used to perform conversion of the transfer speed of an input image data signal. Alternatively, setting terminals can be provided to the image processing ASIC 200, and conversion of the transfer speed of an input image data signal can be performed by using those setting terminals. FIG. 4 is a schematic diagram of an example of such setting terminals provided to the image processing ASIC 200 for switch over the transfer speeds of an image data signal. The setting terminals can be structured such that any one of the four resistors can be prior set depending on the transfer speed. Thus, by prior determining the transfer speed by using the setting terminals of the image processing ASIC 200, the transfer speed of the image data signal can be switched over to that is acceptable to the next stage processor, and the device structure can be further simplified.

In a multifunction peripheral according to a second embodiment of the present invention, an internal clock is converted into a multiplied clock that is a multiple of the internal clock by using a PLL circuit of an image processing ASIC.

Figure 5:
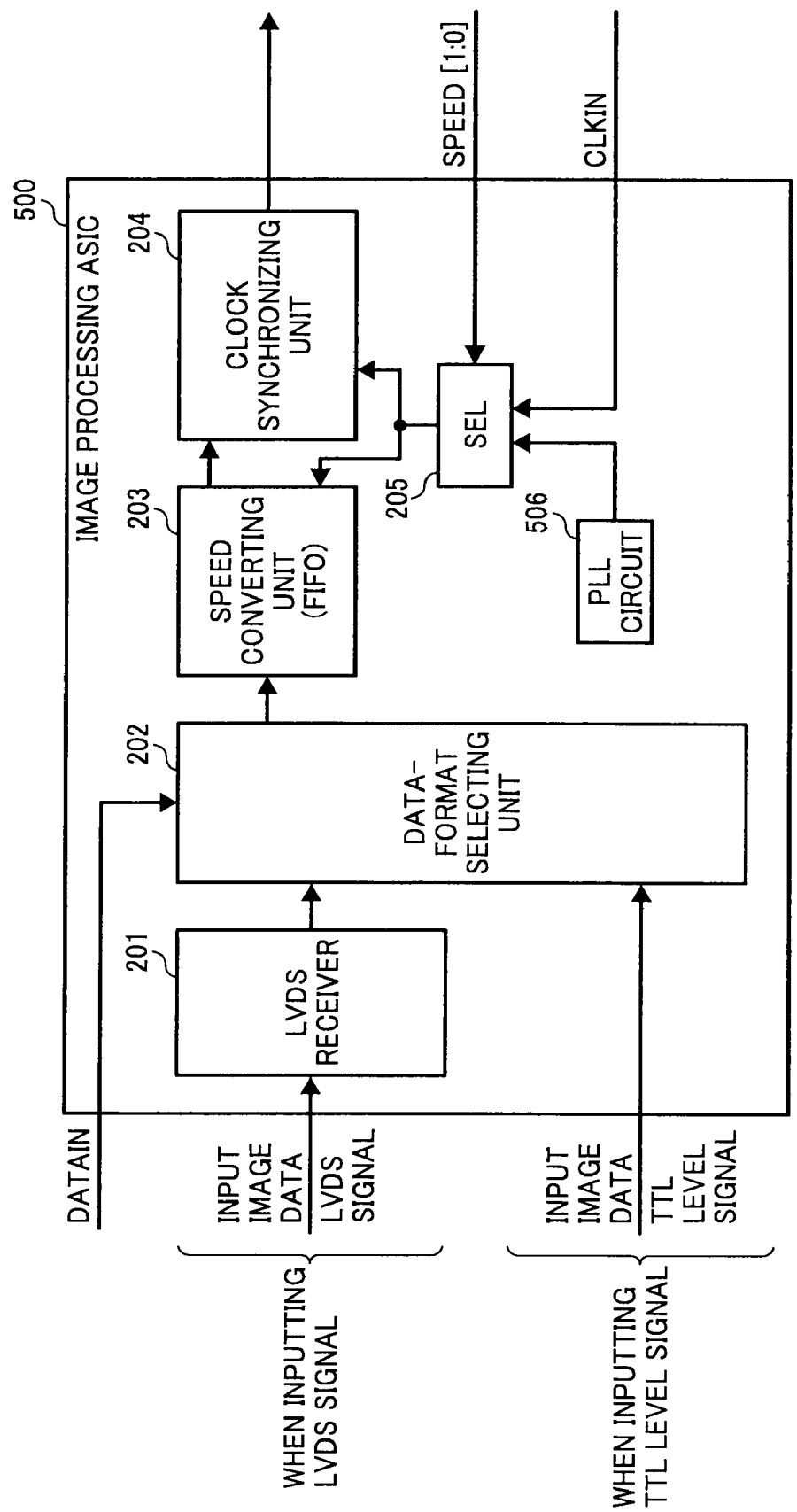
FIG. 5 is a functional block diagram of an image processing ASIC according to a second embodiment of the present invention.

FIG. 5 is a functional block diagram of an image processing ASIC 500 according to the second embodiment. The image processing ASIC 500 includes the LVDS receiver 201, the data-format selecting unit 202, the speed converting unit 203, the clock synchronizing unit 204, the SEL 205, and a PLL circuit 506.

A function and a structure of the LVDS receiver 201, the data-format selecting unit 202, the speed converting unit 203, the clock synchronizing unit 204, and the selection circuit (SEL) 205 are the same as in the first embodiment.

The PLL circuit 506 converts the internal clock into a multiplied clock that is obtained by multiplying a multiplication factor of any one of 1.0 (through), 1.5, and 2.0 with the internal clock. Similarly as in the first embodiment, the internal clock, which is converted into the multiple by the PLL circuit 506, is output to the SEL 205, selected by the SEL 205 depending on the SPEED signal, and output to the speed converting unit 203 and the clock synchronizing unit 204. The image data input process in the second embodiment is carried out similar to the image data input process in the first embodiment.

Thus, in the multifunction peripheral according to the second embodiment, because the internal clock is converted into a multiplied clock by using the PLL circuit 506 of the image processing ASIC 500, the input image data signal can be synchronized with the clock at the transfer speed acceptable to the next stage processor and output, and the specifications required by the next stage processor can be flexibly met.

Figure 6:
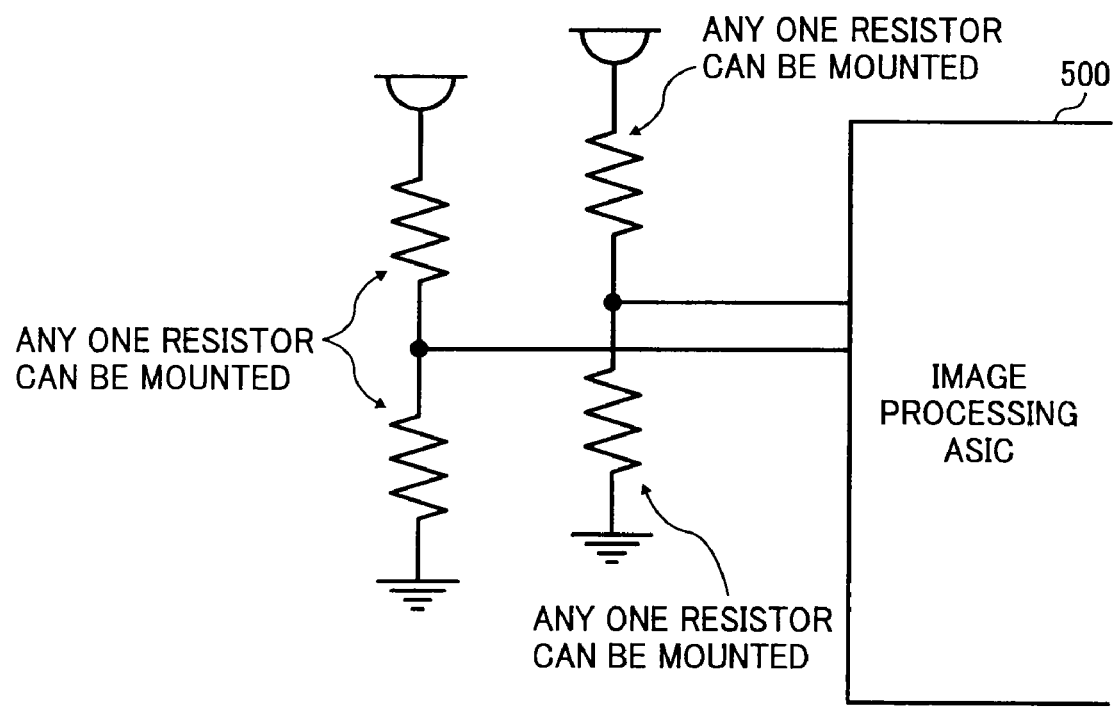
FIG. 6 is a schematic diagram of an example of arrangement of setting terminals used for switching over multiplication factor of an internal clock.

In the second embodiment, the PLL circuit 506 is used to perform conversion of the internal clock into a multiplied clock. Alternatively, setting terminals can be provided to the image processing ASIC 500, and the multiplied clock can be obtained by switching over by using those setting terminals. FIG. 6 is a schematic diagram of an example such setting terminals provided to the image processing ASIC 500 for obtaining the multiplied clock. The setting terminals can be structured such that any one of the four resistors can be prior set depending on the multiple. Thus, because the multiplied clock can be prior determined and switched over by using the setting terminals of the image processing ASIC 500, the input image data signal can be synchronized with the desired clock at the transfer speed acceptable to the next stage processor and output, and the device structure can be further simplified.

In the first and the second embodiments, the LVDS signal and the TTL level signal are explained as examples of input image data signals having different formats. However, image data signals having other formats can be used. Also, three or more image data signals having different formats can be used.

The present invention is not to be thus limited to the embodiments explained earlier. Constituent elements can be transformed and materialized without departing from the scope at the execution phase. Further, various inventions can be realized by using a suitable combination of the constituent elements disclosed in the embodiments mentioned earlier. For example, some of the constituent elements can be eliminated from those indicated in the above embodiments. Moreover, the constituent elements required for different embodiments can be suitably combined.

According to an aspect of the present invention, a plurality of image data signals can be input into an image processor. The image processor includes a data-format selecting unit that determines format of the image data signals and selects, based on the signal format, any one of the image data signals. Thus, although image data of different formats from different image scanners are sent, image processing can be realized by using a single image processor and a device structure can be simplified.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an image scanner that generates an image data signal; and
   an image processor that carries out image processing on the image data signal,
   wherein the image processor capable of receiving a plurality of image data signals having different formats and includes a data-format selecting unit that determines a format of each of the image data signals and selects, based on the format, one image data signal from among the image data signals,
   the image forming apparatus further comprising:
   a speed converting unit that converts a transfer speed of the image data signal selected by the data-format selecting unit according to a transfer speed of a destination processor thereby obtaining a transfer-speed converted image data signal; and
   a clock synchronizing unit that synchronizes the transfer-speed converted image data signal with a predetermined clock and outputs a synchronized image data signal.

2. The image forming apparatus according to claim 1, wherein the image data signals include a low voltage differential signaling (LVDS) signal.

3. The image forming apparatus according to claim 1, wherein the image data signals include a transistor-transistor logic (TTL) level signal.

4. The image forming apparatus according to claim 1,
   wherein the image processor is an application specific integrated circuit (ASIC), and
   the data-format selecting unit is a setting terminal of the ASIC that can selectively receive one image data signal from among the image data signals.

5. The image forming apparatus according to claim 1, wherein the clock synchronizing unit synchronizes the transfer-speed converted image data signal with an internal clock of the image processor.

6. The image forming apparatus according to claim 5, further comprising a phase-locked loop (PLL) circuit that generates a multiplied clock by multiplying a multiplication factor with the internal clock,
wherein the clock synchronizing unit synchronizes the transfer-speed converted image data signal with the multiplied clock.

7. The image forming apparatus according to claim 6, wherein multiplication factor is from 1 to 2.

8. The image forming apparatus according to claim 6, wherein
the image processor is an application specific integrated circuit (ASIC), and
the PLL circuit includes a setting terminal of the ASIC that can switch between a plurality of the multiplication factors.

9. The image forming apparatus according to claim 1, wherein the clock synchronizing unit synchronizes the transfer-speed converted image data signal with an external clock that is input into the image processor from outside.

10. The image forming apparatus according to claim 1, wherein
the image processor is an application specific integrated circuit (ASIC), and
the speed converting unit includes a setting terminal of the ASIC that can switch between a plurality of transfer speeds.

11. An image forming method implemented on an image forming apparatus, the image forming apparatus including an image scanner that generates an image data signal, and an image processor capable of receiving a plurality of image data signals having different formats and carrying out image processing on one of the input image data signals, the image forming method comprising:
the image processor determining a format each of the image data signals and selecting, based on the format, one image data signal from among the image data signals;
converting a transfer speed of the image data signal according to a transfer speed of a destination processor thereby obtaining a transfer-speed converted image data signal; and
synchronizing the transfer-speed converted image data signal with a predetermined clock and outputting a synchronized image data signal.

* * * * *